US010449490B2

(12) United States Patent
Kim et al.

(10) Patent No.: US 10,449,490 B2
(45) Date of Patent: Oct. 22, 2019

(54) UREA-WATER INJECTOR MODULE

(71) Applicant: HYUNDAI KEFICO CORPORATION, Gunpo, Gyeonggi-do (KR)

(72) Inventors: Dong Hyun Kim, Gyeonggi-do (KR); Se Hun Kim, Gyeonggi-do (KR); Hyung Ik Kim, Seoul (KR)

(73) Assignee: HYUNDAI KEFICO CORPORATION, Gunpo, Gyeonggi-do (KR)

(*) Notice: Subject to any disclaimer, the term of this patent is extended or adjusted under 35 U.S.C. 154(b) by 230 days.

(21) Appl. No.: 15/637,727

(22) Filed: Jun. 29, 2017

(65) Prior Publication Data
US 2018/0001258 A1 Jan. 4, 2018

(30) Foreign Application Priority Data

Jun. 30, 2016 (KR) .................. 10-2016-0082724

(51) Int. Cl.
*B01D 53/74* (2006.01)
*B01D 53/56* (2006.01)
(Continued)

(52) U.S. Cl.
CPC ............ *B01D 53/74* (2013.01); *B01D 53/56* (2013.01); *B01D 53/94* (2013.01); *F01N 3/2066* (2013.01);
(Continued)

(58) Field of Classification Search
CPC ........ B01D 53/74; B01D 53/94; B01D 53/56; F01N 2610/02; F01N 3/00; F01N 2610/08; F01N 2550/05; F02D 17/00
See application file for complete search history.

(56) References Cited

U.S. PATENT DOCUMENTS 6,192,677 B1 * 2/2001 Tost ................... B01D 53/9431
60/286
2003/0230646 A1 * 12/2003 Edgar ................ B01D 53/8625
239/533.2
(Continued)

FOREIGN PATENT DOCUMENTS

JP 2006 344532 A 12/2006
JP 3162674 * 8/2010
(Continued)

OTHER PUBLICATIONS

JP 3162674, Translated on Apr. 11, 2019, Machine Translation Provided.*

*Primary Examiner* — Patrick D Maines
(74) *Attorney, Agent, or Firm* — Mintz Levin Cohn Ferris Glovsky and Popeo, P.C.; Kongsik Kim; Jhongwoo Jay Peck

(57) ABSTRACT

A urea-water injector module is provided. The urea-water injector module includes an injector configured to discharge urea water to purify exhaust gas of a vehicle, a main body having the injector installed therein, and a plurality of heat dissipation plates stacked on an exterior surface of the main body to assist heat dissipation. Further the urea-water injector includes a heat block flange disposed under the heat dissipation plate and configured to obstruct heat from being transferred from an exhaust pipe and a mounting unit disposed under the heat block flange and coupled to the exhaust pipe.

7 Claims, 4 Drawing Sheets

(51) Int. Cl.
*B01D 53/94* (2006.01)
*F01N 3/20* (2006.01)
*F01N 3/00* (2006.01)
*F02D 17/00* (2006.01)
*B01D 53/90* (2006.01)

(52) U.S. Cl.
CPC ...... *B01D 53/90* (2013.01); *B01D 2251/2067* (2013.01); *F01N 3/00* (2013.01); *F01N 2550/05* (2013.01); *F01N 2610/02* (2013.01); *F01N 2610/08* (2013.01); *F01N 2610/11* (2013.01); *F01N 2610/1453* (2013.01); *F02D 17/00* (2013.01); *Y02A 50/2325* (2018.01); *Y02T 10/24* (2013.01)

(56) References Cited

U.S. PATENT DOCUMENTS

2006/0107655 A1* 5/2006 Hanitzsch ............. F01N 3/2066 60/286

2008/0295500 A1* 12/2008 Cox ..................... F01N 3/0256 60/295

2010/0320285 A1* 12/2010 Haeberer ............. F01N 3/2066 239/132

2014/0260207 A1* 9/2014 Shovels ............... F01N 3/2066 60/286

FOREIGN PATENT DOCUMENTS

| | | |
|---|---|---|
| JP | 3162674 U | 9/2010 |
| JP | 4706660 B2 | 6/2011 |
| JP | 5145355 B2 | 2/2013 |
| JP | 2014173302 A | 9/2014 |
| KR | 10 1484406 B1 | 1/2015 |
| KR | 10-2015-0099893 A | 9/2015 |
| KR | 10 2015 0121123 A | 10/2015 |

* cited by examiner

UREA-WATER INJECTOR MODULE

CROSS-REFERENCE TO RELATED APPLICATION(S)

This application claims priority to Korean Patent Application No. 10-2016-0082724, filed on Jun. 30, 2016, the disclosure of which is incorporated herein by reference in its entirety.

TECHNICAL FIELD

The present disclosure relates to a urea-water injector module, and more particularly, to a urea-water injector module which is mounted to an exhaust pipe of a vehicle to purify exhaust gas.

RELATED ART

Recently, vehicle exhaust gases have become a main source of environmental pollution. Typically, vehicles include devices for reducing exhaust gas emissions. In particular, a vehicle includes a urea-water injection device for spraying urea water to exhaust gas in a selective catalytic reduction (SCR) manner. The urea-water injection device is configured to discharge urea water to exhaust gas and makes the urea water react with nitrogen oxide contained in the exhaust gas, thus preventing pollutants from being exhaust out of the vehicle. A urea-water injection device is coupled to an exhaust pipe and is exposed to high-temperature exhaust gas. Accordingly, there is a risk of damage or malfunction of the urea-water injection device due to heat. To reduce the risk of damage or malfunction, the urea-water injection device has an air-cooling or water-cooling structure to perform a cooling operation.

Compared to the water-cooling structure, the air-cooling structure has advantages having the degree of freedom in installation location that is relatively high and the production cost are reduced. However, the air-cooling structure has a disadvantage of low cooling performance, compared to that of the water-cooling structure. Although the water-cooling structure improved cooling performance compared to that of the air-cooling structure, the installation location is limited, and requires installing an additional pipe to provide flow of refrigerant. In other words, in the water-cooling structure, refrigerant contained in an engine room of a vehicle is used as refrigerant. Accordingly, various pipes and devices are required to supply the refrigerant to the urea-water injection device disposed in the rear of the vehicle. Therefore, compared to the air-cooling structure, the water-cooling structure is more complex, and the production cost are increased. Consequently, there is a high need for a urea-water injector module to have improved cooling performance and a simplified structure capable of reducing the production cost. [Please include in the Information Disclosure Statement.]

The above information disclosed in this section is merely for enhancement of understanding of the background of the disclosure and therefore it may contain information that does not form the prior art that is already known in this country to a person of ordinary skill in the art.

SUMMARY

A urea-water injector module having a refrigerant flow passage formed in a heat dissipation plate to improve the cooling performance is provided. Another object of the present disclosure provides a urea-water injector module that uses urea water as refrigerant, thereby eliminating the use of cooling water in an engine room as refrigerant. Accordingly, the structure may be simplified compared to the water-cooling structure.

In accordance with an exemplary embodiment of the present disclosure, a urea-water injector module may include an injector configured to receive power from an external device and discharge urea water to purify exhaust gas of a vehicle; a main body having the injector disposed therein; a plurality of heat dissipation plates assembled to an exterior surface of the main body in a stacked structure, with a refrigerant flow passage formed in the heat dissipation plates to provide flow of the urea water in the heat dissipation plates; a heat block flange disposed under the heat dissipation plates and configured to obstruct heat transferred from a cavity below the heat dissipation plates; and a mounting unit installed under the heat block flange, the mounting unit coupled to an exhaust pipe.

The urea-water injector module may further include a disk insulator disposed between the heat dissipation plates and the heat block flange. The urea-water injector module may further include a thermostat valve coupled at a first side thereof to a urea-water tank and coupled at a second side thereof to an inlet of the injector. The thermostat valve may be configured to control circulation of urea water discharged from the urea-water outlet port.

The heat dissipation plates may include an upper heat dissipation plate disposed in an upper portion of the heat dissipation plates, and having a hollow ring (e.g., doughnut) shape with a refrigerant flow passage formed therein; a lower heat dissipation plate disposed below the upper heat dissipation plate at a position spaced apart from the upper heat dissipation plate, and having a hollow ring (e.g., doughnut) shape with a refrigerant flow passage formed therein; and a plurality of cooling pipes disposed between the upper heat dissipation plate and the lower heat dissipation plate and provided to pass through the other heat dissipation plates. Each the cooling pipes may have a linear refrigerant flow passage to provide fluid communication with the respective refrigerant flow passages of the upper and lower heat dissipation plates.

The heat dissipation plates may further include a urea-water inlet port disposed at a first position in the upper heat dissipation plate, and having an inlet that draws urea water into the heat dissipation plates; and a urea-water outlet port disposed at a second position in the upper heat dissipation plate, and having an outlet that discharges urea water out of the heat dissipation plates.

The disk insulator may be formed by stacking carbon graphite films in an axial direction of the injector to transfer heat from the exhaust pipe disposed below the injector in a lateral direction along stacking surfaces of the carbon graphite films of the disk insulator. An air gap may be formed between a periphery of the disk insulator and a peripheral edge of the heat block flange to dissipate the heat moved in the lateral direction along the stacking surfaces of the disk insulator to an exterior through the air gap.

The thermostat valve may be configured to transmit the urea water to the injector when a measured temperature of urea water discharged from the urea-water outlet port is less than a set value and the urea water may be returned to the urea-water tank when the measured temperature of urea water is greater than a set value.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
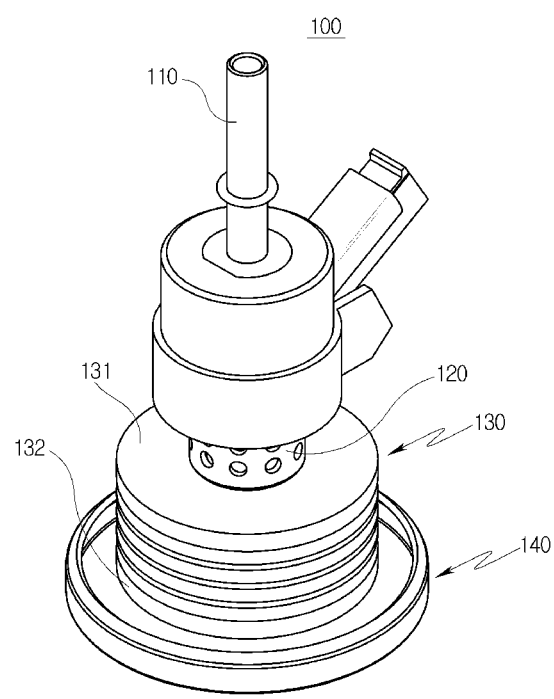
FIG. 1 is an exemplary perspective view illustrating a urea-water injector module in accordance with an exemplary embodiment of the present disclosure.

Exemplary embodiments of the present disclosure will be described below in more detail with reference to the accompanying drawings. The present disclosure may, however, be embodied in different forms and should not be construed as limited to the exemplary embodiments set forth herein. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
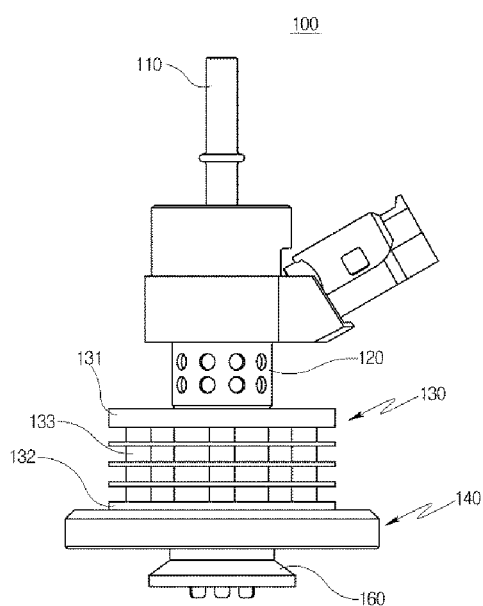
FIG. 2 is an exemplary side view of the urea-water injector module shown in FIG. 1 in accordance with an exemplary embodiment of the present disclosure.
Figure 3:
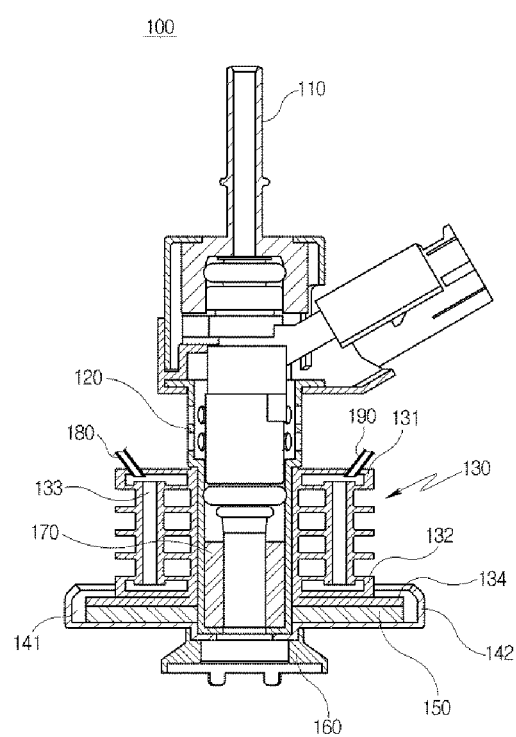
FIG. 3 is an exemplary sectional view of the urea-water injector module shown in FIG. 1 in accordance with an exemplary embodiment of the present disclosure.

FIG. 1 is an exemplary perspective view illustrating a urea-water injector module in accordance with an exemplary embodiment of the present disclosure. FIG. 2 is an exemplary side view of the urea-water injector module shown in FIG. 1. FIG. 3 is an exemplary sectional view of the urea-water injector module shown in FIG. 1. Referring to FIGS. 1 to 4, the urea-water injector module 100 in accordance with an exemplary embodiment of the present disclosure may include an injector 110, a main body 120, a heat dissipation plate 130, a heat block flange 140, and a mounting unit 160.

The urea-water injector module 100 in accordance with the exemplary embodiment of the present disclosure may further include a disk insulator 150. The urea-water injector module 100 may include a thermostat valve 200. The injector 110 may be configured to receive power applied from an external device and discharge urea water to purify vehicle exhaust gas.

The main body 120 may form a cavity that receives the injector 110. Therefore, the injector 110 may be received and mounted in the main body 120. The heat dissipation plate 130 may include a plurality of heat dissipation plates 130 assembled in a stacked structure with an exterior surface of the main body 120. The heat dissipation plate 130 may facilitate dissipation of internal heat of the urea-water injector module 100 heated by exhaust gas. The heat dissipation plate 130 may have a refrigerant flow passage formed therein to allow the urea water to flow through the heat dissipation plate 130.

In particular, the heat dissipation plate 130 may include an upper heat dissipation plate 131 disposed in an upper portion of the heat dissipation plate 130 and may have a hollow ring shape with a refrigerant flow passage formed therein; a lower heat dissipation plate 132 is disposed below the upper heat dissipation plate 131 spaced apart therefrom and disposed adjacent to (e.g., to face) the upper heat dissipation plate 131 with respect to an axial direction, and has a hollow ring shape with a refrigerant flow passage formed therein; and a plurality of cooling pipes 133 disposed between the upper heat dissipation plate 131 and the lower heat dissipation plate 132 and provided to pass through the other heat dissipation plates 130. For example, each cooling pipe may have a linear refrigerant flow passage to provide fluid communication with the refrigerant flow passages of the upper and lower heat dissipation plates 131 and 132. In other words, each pipe 133 may be installed parallel to the central axis of the main body 120, considering the circulation of refrigerant. The heat dissipation plate 130 may further include a lowermost heat dissipation plate 134 disposed under the lower heat dissipation plate 132.

The urea-water injector module 100 in accordance with an exemplary embodiment of the present disclosure may include the heat dissipation plate 130 having the above-mentioned structure with the refrigerant passage and reduces the temperature of internal heat using urea water as refrigerant. To provide the foregoing refrigerant circulation, the heat dissipation plate 130 may further include a urea-water inlet port 180 disposed at a first position in the upper heat dissipation plate 131 to form an inlet through that draws urea water into the heat dissipation plate 130, and a urea-water outlet port 190 disposed at a second position in the upper heat dissipation plate 131 to form an outlet that discharges urea water out of the heat dissipation plate 130. In particular, the urea-water inlet port 180 and the urea-water outlet port 190 are defined, in a broad sense, as concepts including pipes coupled to a urea-water tank 210, which will be described later herein.

The heat block flange 140 may be disposed under the heat dissipation plate 130 and may obstruct heat from being transferred to the heat dissipation plate 130 from the cavity beneath it. In particular, the heat block flange 140 may be coupled to the lowermost end of the main body 120 and may be disposed under the lowermost heat dissipation plate 134. The heat block flange 140 may have a peripheral edge 142 which protrudes in an upward direction to receive the disk insulator 150 in the heat block flange 140.

The disk insulator 150 may be disposed between the heat dissipation plate 130 and the heat block flange 140 to provide heat insulation. The disk insulator 150 may be disposed between the lowermost heat dissipation plate 134 and the heat block flange 140 and formed of a carbon graphite film to obstruct heat transfer along with the heat block flange 140. For example, the disk insulator 150 may be formed by stacking carbon graphite films in an axial direction of the injector 110 to move heat transferred from an exhaust pipe disposed below the injector 110 in the lateral direction along the stacking surfaces of the carbon graphite films. Accordingly, heat transfer in an upward direction into the injector 110 may be prevented.

In particular, an air gap 141 may be formed between the periphery of the disk insulator 150 and the peripheral edge 142 of the heat block flange 140. The heat transferred in the lateral direction along the stacking surfaces of the disk insulator 150 may be dissipated to the exterior through the air gap 141. The obstruction of the heat transfer to the injector 110 may be more effective. The mounting unit 160 may be disposed under the heat block flange 140 and may be coupled to the exhaust pipe, to couple the urea-water injector module 100 with the exhaust pipe.

The urea-water injector module 100 may further include a main body insulator 170 disposed between the injector 110 and the main body 120. In particular, the main body insulator 170 may be formed in a shape having a carbon graphite film actuated (e.g., rolled) in a radial direction from the center axis of the main body 120. The main body insulator 170 may rapidly transfer heat from the injector 110 to the heat dissipation plate 130, to thereby provide a more improved cooling operation.

The thermostat valve 200 may be coupled at a first side thereof to the urea-water tank 210 and coupled at a second side thereof to the inlet of the injector 110. Accordingly, the circulation of urea water discharged from the urea-water outlet port 190 may be adjusted. The thermostat valve 200 may be configured to transmit the urea water to the injector 110 and re-discharge the urea water to exhaust gas when a measured temperature of urea water discharged from the urea-water outlet port 190 is less than a set value. When the measured temperature of urea water is greater than a set value, the urea water returns to the urea-water tank 210 and heated urea water may have the temperature reduced (e.g. cooled).

Figure 4:
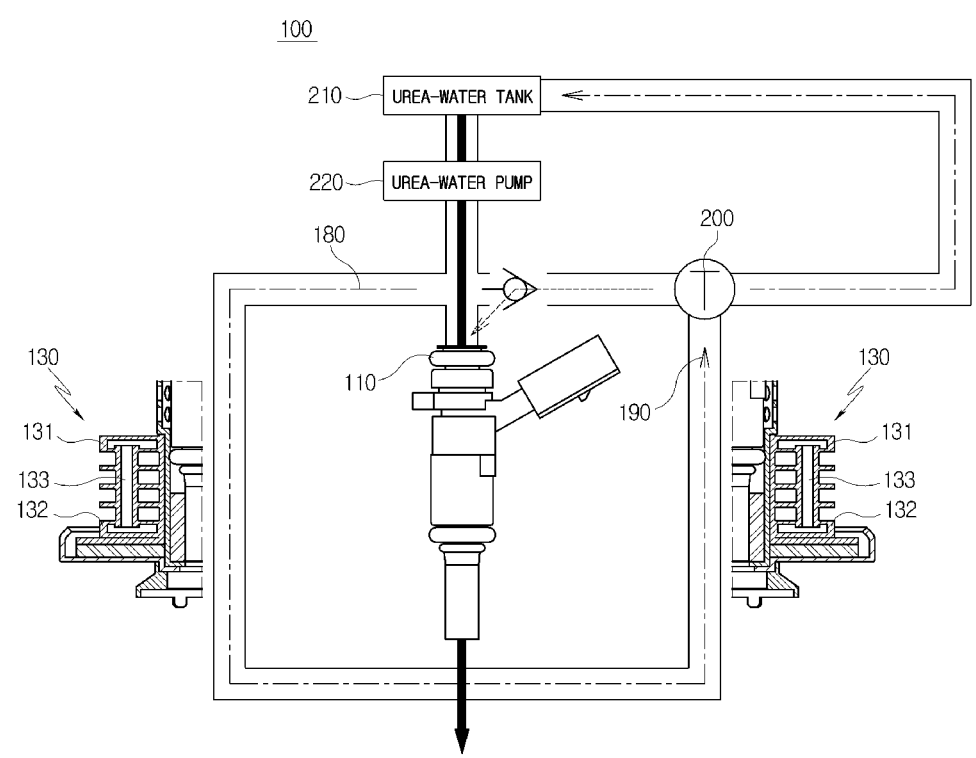
FIG. 4 is an exemplary schematic conceptual view illustrating the flow of urea water through the urea-water injector module shown in FIG. 1 in accordance with an exemplary embodiment of the present disclosure

FIG. 4 is an exemplary schematic conceptual view illustrating the flow of urea water through the urea-water injector module shown in FIG. 1. As mentioned above, the urea-water inlet port 180 and the urea-water outlet port 190 are defined, in a broad sense, as concepts including pipes coupled to a urea-water tank 210. FIG. 4 is an exemplary view illustrating the flow of urea water. Referring to FIG. 4, urea water may be stored in the urea-water tank 210 disposed at a predetermined position in the vehicle.

A portion of the urea water may be drawn into the injector 110 through the urea-water pump 220. The remainder of the urea water may be drawn into the urea-water inlet port 180. In particular, urea water drawn into the injector 110 may be discharged (e.g., sprayed) to exhaust gas in the exhaust gas pipe. Urea water drawn into the urea-water inlet port 180 may flow through the refrigerant flow passage formed in the upper heat dissipation plate 131, the cooling pipe 133, and the lower heat dissipation plate 132. Accordingly, the temperature of the overall body of the heat dissipation plate 130 may be reduced by the urea water before being discharged out of the heat dissipation plate 130 through the urea-water outlet port 190. For example, the plurality of heat dissipation plates 130 disposed between the upper heat dissipation plate 131 and the lower heat dissipation plate 132 may be more effectively cooled by the cooling pipe 133.

Therefore, the cooling efficiency of the above-mentioned structure according to an exemplary embodiment of the present disclosure may be markedly increased compared to that of the conventional air-cooling structure. Furthermore, in the structure according to the present disclosure, when urea water is used as refrigerant, a separate component (e.g., a pipe for supplying cooling water from an engine room of the vehicle to the urea water injection module disposed in the rear part of the vehicle) is not required. Accordingly, the present disclosure provides a more simplified vehicle structure.

Urea water discharged from the urea-water outlet port 190 may be transmitted to the thermostat valve 200 coupled with the urea-water outlet port 190. In other words, when a measured temperature of urea water discharged from the urea-water outlet port 190 is less than a set value, the urea water may be transmitted to the injector 110 to re-discharge (e.g., re-spray) the urea water to exhaust gas. When the measured temperature of urea water is greater than a set value, the urea water may be returned to the urea-water tank 210 to reduce the temperature of the heated urea water.

Therefore, urea water may flow through the thermostat valve 200 through the urea-water outlet port 190 after having performed the cooling function. In particular, where urea water has a relatively greater temperature, the urea water may be discharged to the urea-water tank 210 and then reused after the process of cooling the urea water has been performed again. When urea water has a relatively low temperature, the urea water may be discharged (e.g., sprayed) to exhaust gas by the injector 110 pollutants may be prevented from being exhausted out of the vehicle.

For example, it was experimentally known that it is effective in increasing the cooling efficiency when the thermostat valve 200 is configured having urea water moved to the injector 110 when the temperature of the urea water is less than about 110° C. In particular urea water may be moved to the urea-water tank 210 when the temperature of the urea water is greater than about 130° C. A check valve may be additionally disposed between the thermostat valve 200 and the injector 110. The check valve may be configured to prevent urea water from flowing backward toward the thermostat valve 200. Namely, in the present disclosure, the thermostat valve 200 may be mounted to enable urea water to be selectively reused or discharged to exhaust gas based on the temperature of the urea temperature. Accordingly, the cooling efficiency of the urea-water injector module 100 may be markedly enhanced.

As described above, in a urea-water injector module in accordance with the present disclosure, a refrigerant flow passage may be formed in a heat dissipation plate to enhance the cooling performance. Furthermore, in the urea-water injector module in accordance with the present disclosure, a separate pipe for using cooling water disposed in an engine room is not required.

While the present disclosure has been described with respect to the exemplary embodiments, it will be apparent to those skilled in the art that various changes and modifications may be made without departing from the spirit and scope of the disclosure as defined in the following claims.

What is claimed is:

1. A urea-water injector module comprising:
    an injector configured to discharge urea water to purify exhaust gas of a vehicle;
    a main body having the injector disposed therein;
    a plurality of heat dissipation plates coupled to an exterior surface of the main body in a stacked structure, with a refrigerant flow passage formed in the heat dissipation plates having urea water that flows in the heat dissipation plates;
    a heat block flange disposed under the heat dissipation plates and configured to obstruct heat transferred from a cavity below the heat dissipation plates;
    a mounting unit installed under the heat block flange, the mounting unit coupled to an exhaust pipe; and
    a thermostat valve coupled at a first side to a urea-water tank and coupled at a second side to an inlet of the injector, wherein the thermostat valve is configured to control circulation of urea water discharged from a urea-water outlet port of the heat dissipation plates.

2. The urea-water injector module according to claim 1, further comprising:
    a disk insulator disposed between the heat dissipation plates and the heat block flange.

3. The urea-water injector module according to claim 1, wherein the heat dissipation plates comprise:
    an upper heat dissipation plate disposed in an upper portion of the heat dissipation plates, and having a hollow ring shape with a refrigerant flow passage formed therein;
    a lower heat dissipation plate disposed below the upper heat dissipation plate spaced apart from the upper heat dissipation plate, and having a hollow ring shape with a refrigerant flow passage formed therein; and
    a plurality of cooling pipes disposed between the upper heat dissipation plate and the lower heat dissipation plate and provided to pass through the other heat dissipation plates, each of the cooling pipes having a linear refrigerant flow passage to provide fluid communication with the respective refrigerant flow passages of the upper and lower heat dissipation plates.

4. The urea-water injector module according to claim 3, wherein the heat dissipation plates further comprise:
    a urea-water inlet port disposed at a first position in the upper heat dissipation plate, and having an inlet that draws urea water into the heat dissipation plates; and
    a urea-water outlet port disposed at a second position in the upper heat dissipation plate, and having an outlet that discharges urea water out of the heat dissipation plates.

5. The urea-water injector module according to claim 2, wherein the disk insulator is formed by stacking carbon graphite films in an axial direction of the injector to transfer heat from the exhaust pipe disposed below the injector in a lateral direction along stacking surfaces of the carbon graphite films of the disk insulator.

6. The urea-water injector module according to claim 5, wherein an air gap is formed between a periphery of the disk insulator and a peripheral edge of the heat block flange to dissipate heat moved in the lateral direction along the stacking surfaces of the disk insulator to an outside through the air gap.

7. The urea-water injector module according to claim 1, wherein the thermostat valve is configured to transmit the urea water to the injector when a measured temperature of urea water discharged from the heat dissipation plates is less than a set value, and to return to the urea-water tank when the measured temperature of urea water is greater than a set value.

* * * * *